United States Patent

[11] 3,573,746

[72] Inventors Prentice I. Robinson
Hudson, N.H.;
Ned Chang, Belmont, Mass.; An Wang,
Lincoln, Mass.
[21] Appl. No. 782,021
[22] Filed Dec. 9, 1968
[45] Patented Apr. 6, 1971
[73] Assignee Wang Laboratories, Inc.
Tewksbury, Mass.
Continuation-in-part of application Ser. No. 536,416, Mar. 22, 1966, now Patent No. 3,428,950.

[54] CALCULATOR SYSTEM
20 Claims, 16 Drawing Figs.

[52] U.S. Cl. .......... 340/172.5
[51] Int. Cl. .......... G11b 13/00
[50] Field of Search .......... 340/172.5; 235/157; 235/61.6, 156; 235/156

[56] References Cited
UNITED STATES PATENTS

| | | | |
|---|---|---|---|
| 3,375,498 | 3/1968 | Scuitto et al. .......... | 340/172.5 |
| 3,428,950 | 2/1969 | Chang et al. .......... | 340/172.5 |

*Primary Examiner*—Raulfe B. Zache
*Attorney*—Willis M. Ertman

ABSTRACT: An electronic calculator system includes an arithmetic unit, an input register that receives signals from a keyboard and optionally from one or more card readers for transmission to the arithmetic unit and a memory unit. The card readers are pluggably connected in series and each includes interlock control which cooperates with a program counter to channel instruction and numerical data to the arithmetic unit from the card reader through the input register. The memory unit includes two reversible address counters which in conjunction with a program stored in a card reader enable efficient performance of mathematical manipulations of the matrix type.

CALCULATOR SYSTEM

SUMMARY OF INVENTION

This application is a continuation-in-part of our copending application Ser. No. 536,416, filed Mar. 22, 1966, entitled "Programmable Calculating Apparatus," now Pat. No. 3,428,950.

This invention relates to calculating apparatus and more particularly to an expandable calculator system which permits the optional addition of record sensing devices and/or of memory capacity to provide arrangements which enable calculator operation pursuant to a series of instructions and versatile branching and data selection operations.

Calculators (devices without large capacity data storage) have ability to perform many of the complex mathematical manipulations of which large general purpose computers are capable. But typically they do not have the ability to perform, automatically, a series of instructions in the nature of a program. In general, the lack of sufficient storage in calculators has precluded the efficient use of a program, for rarely are useful programs merely an invariable series of steps; generally, decisions must be made pertaining to the data being operated on, which decisions determine alternatives that the program may follow. The inability of the typical calculator to make decisions means that a human operator must be interposed each time a decision is to be made. Also, it is frequently desirable to repeat a particular operation and the ability to reuse program steps becomes significant.

Decisions are made in programmed computers by branching on a predetermined condition. In computers, branching is effected by an instruction, the address part of which specifies the address in storage at which the next instruction in the program is to be found. Calculators, not having sufficient storage facilities, have been unable to perform branching in this manner.

Accordingly it is an object of this invention to provide novel calculator systems with increased flexibility and capacity for performing complex mathematical operations, while maintaining its low cost, compactness and simplicity of design.

Another object of this invention is to provide a calculator system which can perform a series of instructions, in the nature of a program, automatically and without the need for a large storage capacity, which instructions contain an operation portion but no address portion.

A further object of this invention is to provide a calculator system which can, upon the basis of results of a calculator operation, select a nonsuccessive instruction in a preestablished series of instructions.

A further object of the invention is to provide a calculator system operative in response to instructions having operation portions only which can branch to any instruction in a preestablished series of instructions.

Another object of the invention is to provide a novel and improved calculator system arranged for optional cooperation with a flexible and versatile data storage arrangement.

Another object of the invention is to provide a novel and improved data storage arrangement for use with a calculator system.

A further object of the invention is to provide a novel and improved data storage arrangement which facilitates efficient performance of mathematical manipulations of the matrix type.

Still another object of the invention is to provide an expandable calculator system including basic calculator apparatus and optional additional apparatus which increases the versatility of operation of the system.

Features of and invention include the concept of an expandable calculator system which includes an arithmetic unit and a keyboard unit for entering numerical and instruction data into the arithmetic unit for performing manipulations on the entered numerical information; and buffering means including an input register coupled between the arithmetic unit and the keyboard and a second input terminal to which optional equipment such as a record reader or a data storage unit is adapted to be connected to increase the capacity and capabilities of a calculator system. The basic calculator unit may operate independently of the optional additional equipment but include interlocks to coordinate its operation with the operation of additional equipment.

The optional record reader includes control which enables a branch or skipping of a series of items on the record, or the repetitive processing of a sequence of items on the record in response to signals generated in response to a data item recorded on the record.

The optional data storage unit includes an associated programmer or sequencer which coordinates the channeling of data between the memory and the arithmetic unit in the same format as that employed at data entered through the keyboard and addressing control which facilitates mathematical manipulations of the matrix type.

An expandable electronic calculator system constructed in accordance with the invention includes as basic components, an arithmetic unit for performing arithmetic operations on data, and a manually operable control unit for entry of data and control instructions for the control of the arithmetic unit. Each manual actuation enters either a numerical data item or an instruction. This basic system includes an input register for receiving the input data for application to the arithmetic unit. Optional supplemental data entry means responsive to a record that is inserted in and sensed by a record receiving device also is operative to effect transfers between it and the input register in response to manually actuated commands from the first data entry means. An optional supplemental data storage unit, also operable in response to manually actuated commands from the first data entry means may also be employed to expand the capabilities of the calculator system. The calculator includes a control unit which coordinates the operation of the arithmetic unit and the first data entry means with the optional second data entry means and the optional storage capacity. The control unit further enables branch of programmed instructions and performance of subroutines.

In a particular embodiment the control includes search logic and control logic responsive to a first predetermined data item on the record (or a manually actuable key) for actuating the search logic to search for a particular item identified by the control logic, effectively skipping a series of items on the record. In response to a second predetermined data item, the control logic returns to continue processing data items following the first (branch initiating) data item. Also the embodiment includes a program verifying control responsive to one manually actuated key for checking the program of data items on the record in the receiving device or the proper placement of that record in the device; and responsive to another key for checking a particular data item and its address on the record. The memory unit in a particular embodiment includes two counters, each of which can be effectively stepped up or down. These two counters control the addressing of the two coordinate addresses of the memory and further control is provided in response to a single instruction to actuate both counters to change their setting in an arrangement which facilitates mathematical manipulations of the matrix type.

In an embodiment the control includes logic for loading an instruction identity in the input register and transfer means responsive to the detection of a branch condition to transfer that instruction identity to a control register to cause the control register to specify a nonsequential data item.

Apparatus constructed in accordance with the invention enables expansion of the variety of data manipulations to be performed by a calculator with addition of optional, compatible supplementary data entry control means and supplemental data storage capacity operable in response to manually actuated keystroke.

Other objects, features and advantages of the invention will be seen as the following description of particular embodiments thereof progress, in conjunction with the drawings, in which.

DESCRIPTION OF PARTICULAR EMBODIMENTS

Figure 1:
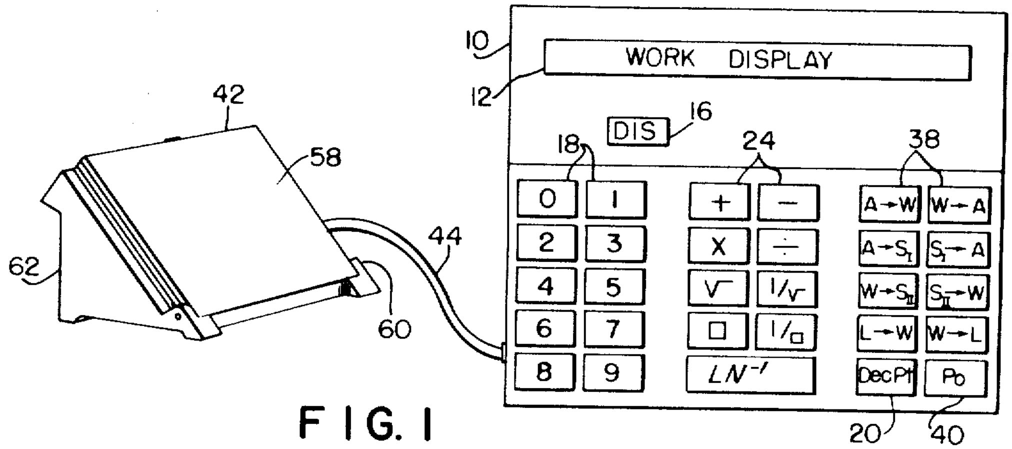
FIG. 1 is a view of a first embodiment of a calculator system including an optional card reader constructed in accordance with the invention.

There is shown in FIG. 1, a diagrammatic view of a calculator unit 10 that includes a display 12 and manually actuable control keys 16, 18, 20, 24, 30 and 40. Display key 16 when operated causes the work register 14 (FIG. 6) to appear on display 12; numerical keys 18, when operated, enter numerical values in the work register 14; decimal point key 20, when operated, places information in decimal register 22 (FIG. 6); operations to be performed by the arithmetic unit of the calculator are selected by instruction keys 24; keys 38 control transfers between the arithmetic unit and storage registers; and key 40 initiates operation of card reader 42. Specific operations performed in response to these keys are listed in the following two tables:

TABLE I.—TRANSFER KEYS

| Character | Function |
|---|---|
| A——>W | Transfer contents of Accumulator Register 26 to Work Register 14. |
| W——>A | Transfer contents of Work Register 14 to Accumulator Register 26. |
| A——>$S_1$ | Transfer contents of Accumulator Register 26 to Storage I 34. |
| $S_1$——>A | Transfer contents of Storage I 34 to Accumulator Register 26. |
| W——>$S_2$ | Transfer contents of Work Register 14 to Storage II 36. |
| $S_2$——>W | Transfer contents of Storage II 36 to Work Register 14. |
| W——>L | Transfer contents of Work Register 14 to Log Register 28. |
| L——>W | Transfer contents of Log Register 28 to Work Register 14. |

TABLE II.—INSTRUCTION KEYS

| Character | Function |
|---|---|
| + | Add. |
| − | Subtract. |
| × | Multiply. |
| ÷ | Divide. |
| √ | Calculate square root. |
| 1/√ | Calculate reciprocal of square root. |
| □ | Calculate square. |
| 1/□ | Calculate reciprocal of the square. |
| $LN^{-1}$ | Generate antilogarithm. |

Card reader 42 is pluggably connected to the arithmetic unit by means of cable 44. A card 46 (FIG. 5) used with this reader has a matrix of prescored positions arranged in 40 columns 48 and 12 rows 50. Each column 48 is divided into two groups of six data positions each. Selected prescored positions in each group may be punched out, using a pencil for example, to form one or more apertures in the group to define a data item. The 6-bit binary code of a data item is sensed by the card reader 42 and applied over cable 44 to the input register of the calculator and provides signals in the same form as they are received from the keys 18, 20, 24, 38 and 40.

In the following chart certain of the commands which may be programmed on card 46 are listed and explained. The number to the left of each command is its representation in octal code. To obtain the corresponding code for punching on a program card, the octal digits are weighted in sequence 40, 20, 10, 4, 2 and 1. For example, the code to start the card reader operation is 42 (b 100010); and the code to stop the card reader is 26 (010110).

TABLE III.—PROGRAM CODE

| Code | Command | Description |
|---|---|---|
| (00) | Not assigned | |
| (01) | Prime | Clear all registers. |
| (02) | √ | Calculate square root. |
| (03) | 1/√ | Calculate reciprocal of square root. |
| (04) | □ | Calculate square. |
| (05) | 1/□ | Calculate reciprocal of square. |
| (06) | × | Multiply. |
| (07) | + | Add. |
| (10) | $LN^{-1}$ | Generate antilogarithm. |
| (11) | − | Subtract. |
| (12) | . | Decimal point. |
| (13) | ÷ | Divide. |
| (14) | 0 | Cardinal Numbers. |
| (15) | 1 | |
| (16) | 2 | |
| (17) | 3 | |
| (20) | 4 | |
| (21) | 5 | |
| (22) | 6 | |
| (23) | 7 | |
| (24) | 8 | |
| (25) | 9 | |
| (26) | Stop | Cease operation. |
| (27) | W—→> PC | Transfer contents of first two stages of Work Register 14 to Program Counter 30. |
| (30) | W—→DC | Transfer contents of first two stages of Work Register 14 to Decrement Counter 32. |
| (31) | DC—→W | Transfer contents of Decrement Counter 32 to first two stages of Work Register 14. |
| (32) | W—→A | Transfer contents of Work Register 14 to Accumulator Register 26. |
| (33) | A—→W | Transfer contents of Accumulator Register 26 to Work Register 14. |
| (34) | W—→L | Transfer contents of Work Register 14 to Log Register 28. |
| (35) | L—→W | Transfer contents of Log Register 28 to Work Register 14. |
| (36) | A—→$S_1$ | Transfer contents of Accumulator Register 26 to Storage I 34. |
| (37) | $S_1$—→A | Transfer contents of Storage I 34 to Accumulator Register 26. |
| (40) | W—→$S_2$ | Transfer contents of Work Register 14 to Storage II 36. |
| (41) | $S_2$—→W | Transfer contents of Storage II 36 to Work Register 14. |
| (42) | $P_0$ | Begin program (under Card Reader control). |
| (43) | PDS | Store contents of Decrement Counter 32 in Decrement Counter Store 54 and contents of Program Counter 30 in Program Counter Store 56 and transfer contents of first two stages in Work Register 14 to Program Counter 30. |
| (44) | PDR | Recall the values in Program Counter Store 56 and Decrement Counter Store 54. |
| (45) | DEC | Step Decrement Counter 32 by one unit. |
| (46) | Test DC | Test DC for zero. |
| (47) | Test A | Test Accumulator Register 26 for zero. |
| (50) | Test W | Test Work Register 14 for zero. |
| (51) | Test L | Test Log Register 28 for sign. |

Figures 2, 3, 4, 5:
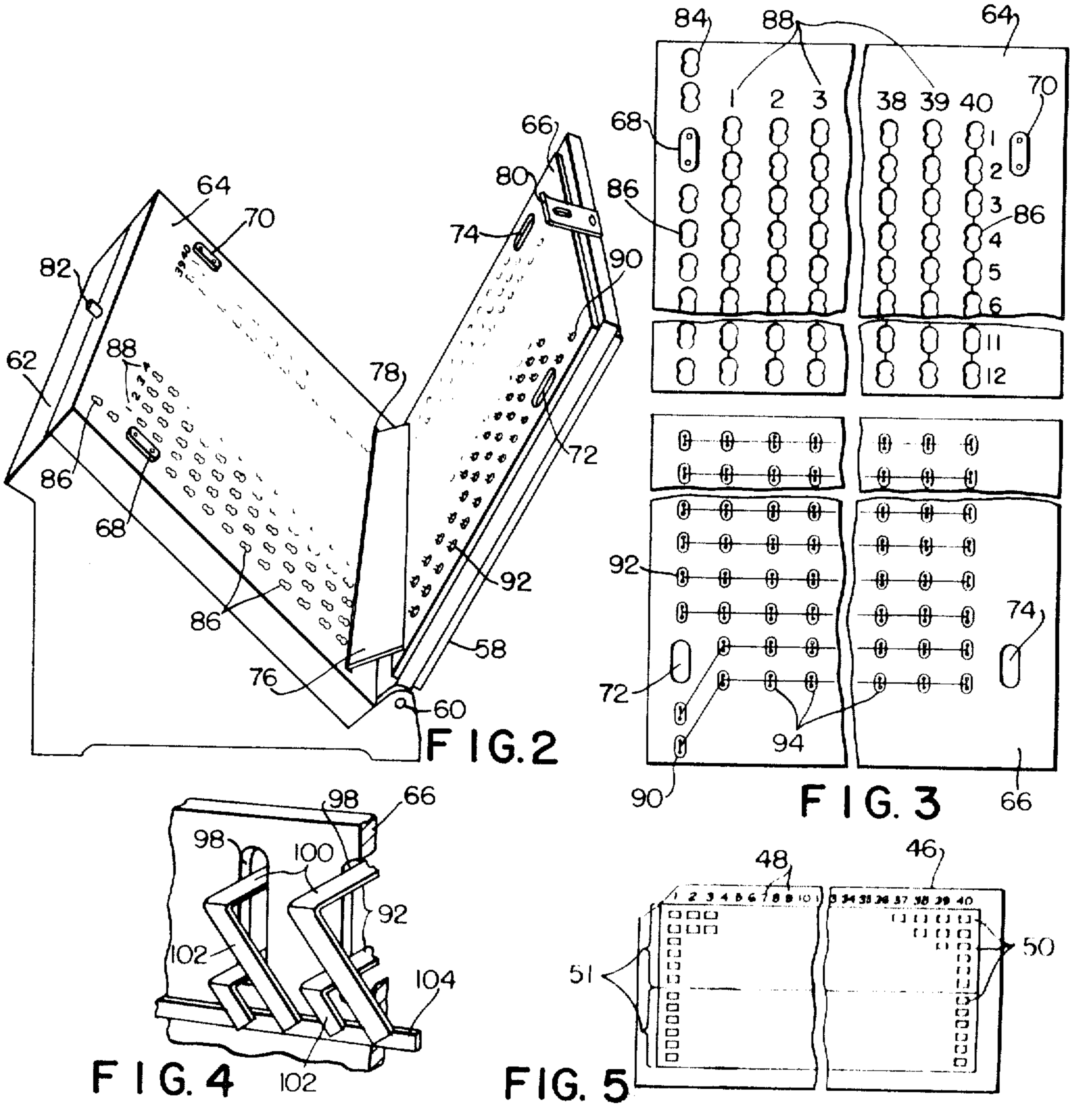
FIG. 2 is a perspective view of the card reader shown in FIG. 1 in open position.
FIG. 3 is a schematic diagram of the contacts in the cover and base of the card reader shown in FIG. 1.
FIG. 4 is an enlarged view of the contacts in the cover of the card reader shown in FIG. 1.
FIG. 5 is a view of a card usable with the calculator system shown in FIG. 1.

Card reader 42 is shown in more detail in the open position in FIG. 2. Cover 58 is attached by hinges 60 to base 62. The card 46 is received between face 64 of the base and face 66 of the cover and aligned laterally by vertical guides 68, 70 which are received in corresponding recesses 72, 74 in cover 58 so that faces 64, 66 meet flush with the card between them. Stop 76, which moves into slot 78 as the cover is closed, locates the card vertically and also limits the movement of cover 58. Latch elements 80, 82 secure the cover in closed position.

Face 64 of the base 62 contains a matrix 88 of kidney-shaped contacts 86 arranged in 40 columns 84, of 12 contacts each. A diode decoding matrix housed within base 62 decodes signals applied to contacts 86 and applies those decoded signals to cable 44. Face 66 contains a corresponding matrix 94 of pairs of prong contact elements 92 arranged in 12 rows and 40 columns. When the cover is closed, each pair of prongs 92 engages a corresponding contact 86 unless the corresponding data position on an interposed card has not been punched out. All the prongs 92 in each row are connected in series and connected to a corresponding pair of prongs in column 90. The contacts 86 and matrix 88 are connected together in groups of six but are not connected directly to any of the contacts in column 84 which is outside the matrix area.

To read a data item on the card, the six contacts in the corresponding section of the corresponding column in matrix 88 are energized. Signals thus are transferred to the corresponding prongs in contact with those energized contacts which are applied via the corresponding prongs in column 90 and the contacts 86 in column 84 to the output lines in cable 44.

Figure 6:
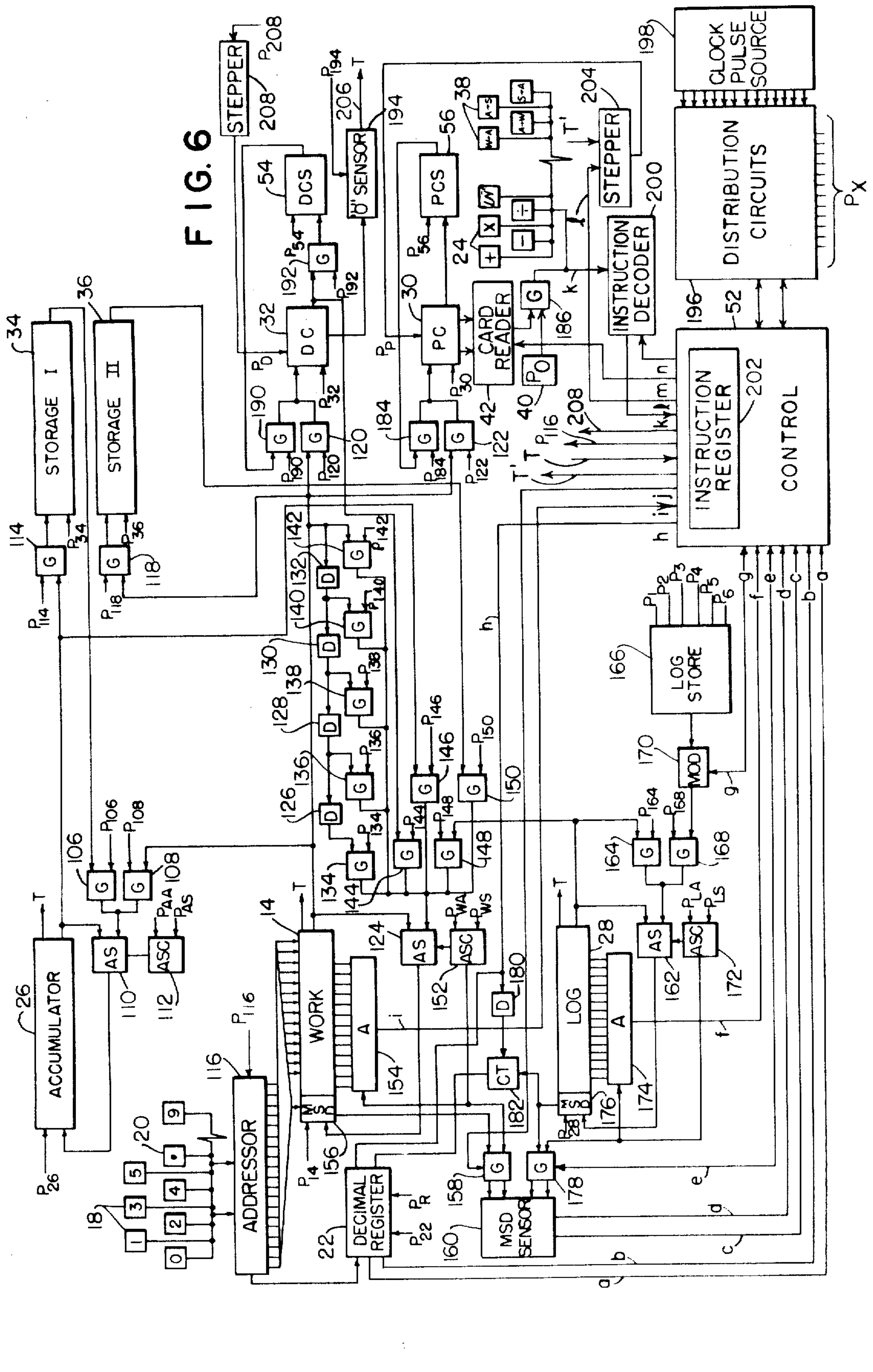
FIG. 6 is a block diagram of the calculator system shown in FIG. 1.

A block diagram of a calculator system embodying the present invention is shown in FIG. 6. Accumulator 26 is a 10 digit position shift register for operation in a binary coded decimal radix, thus each "position" is actually four bits. The most significant digit position is at the left and the least significant digit position is at the right of Accumulator Register 26. Work Register 14, Log Register 28 and Storage Registers 34 and 36 are of the same type as Accumulator Register 26; the entire arithmetic portion of the system operates in the binary coded decimal radix. Accumulator 26 may accumulate the sum of, or the difference between, a value which it contains and one supplied from Storage 34 via Gate 106 or from Work Register 14 via Gate 108. Adder-Subtracter 110, conditioned to add or subtract by Add-Subtract Control 112, receives the output digit of the least significant stage of Accumulator 26 at one of its inputs and receives at its other input a second digit from whichever of Gates 106 or 108 is enabled and presents the result digit to the input (most significant) stage of the Accumulator; Gate 106 is enabled by a signal at $P_{106}$ and Gate 108 by a signal at $P_{108}$. Add-Subtract Control 112 will condition Adder-Subtractor 110 to add if a signal is received at $P_{AA}$ or subtract if a signal is received at $P_{AS}$. Accumulator 26 may be shifted by the application of a pulse at $P_{26}$. The digits in Storage 34 may be shifted by application of a pulse at $P_{34}$ and information entered into it through Gate 114 by applying an enabling signal at $P_{114}$.

Information represented by Numeral Keys 18 is entered in Work Register 14 by Addresser 116. Similar numerical data received from Card reader 42 is presented to Addresser 116 at $P_{116}$. Each time a Numeral Key 18 is depressed a binary 1 is stepped through Decimal Register 22 until Decimal Point Key 20 is depressed. At that time the stepping of Decimal Register 22 ceases and the position of the decimal point in the entered number is recorded.

Work Register 14 provides signals to Accumulator 26 via Gate 108, to Storage 36 via Gate 118, to Decrement Counter 32 via Gate 120, to a Program Counter 30 via Gate 122 and provides two inputs to its associated Adder-Subtracter 124. One of the inputs is connected directly to Adder-Subtracter 124 while the second input, originating at the same output of Work Register 14, may be directed through none, one or more of the Delays 126, 128, 130, and 132 depending upon which one of Gates 134, 136, 138, 140 or 142, is enabled by a signal at $P_{134}$, $P_{136}$, $P_{138}$, $P_{140}$ or $P_{142}$, respectively. The second input to Adder-Subtracter 124 may also receive a signal from Decrement Counter 32 via Gate 144 enabled by a signal at $P_{144}$, from accumulator 26 via Gate 146 enabled by a signal at $P_{146}$, from Log Register 28 via Gate 148 enabled by a signal at $P_{148}$, or from Storage 36 via Gate 150 enabled by a signal at $P_{150}$. Work Register 14 receives information from Adder-Subtracter 124 and is shifted by a signal at $P_{14}$. The four Delays 126, 128, 130 and 132 provide a means for presenting the value stored in Work Register 14 to Adder-Subtracter 124 shifted by one, two, three of four positions depending upon which gate is enabled. Any number of delays may be used dependent upon the capabilities desired for a particular machine.

Add-Subtract Control 152 will condition Adder-Subtracter 124 to add if a signal is received at $P_{WA}$ or to subtract if a signal is received at $P_{WS}$. AND circuit 154 monitors a number of stages, other than the Most Significant Digit Stage (MSD) 156, of Work Register 14 in accordance with the accuracy desired in the calculations and will respond to an all-zero input when Add-Subtract Control 152 directs subtraction and to an all-nines input when it directs addition. The output of AND circuit 154 is applied to the Control 52 of the calculator via line *i*.

Add-Subtract Control 152 also applies a signal to Gate 158 along with one from MSD 156. Both signals will be presented to the Most Significant Digit Sensor (MSD Sensor) 160 when Gate 158 is enabled by a signal on line j from Control 52 which is present when the logarithm of a number in Work Register 14 is being accumulated in Log Register 28. With Add-Subtract Control 152 directing addition MSD Sensor 160 will be conditioned to seek a one in MSD 156, while a subtract direction will condition MSD Sensor 160 to seek a zero in MSD 156.

The accumulation of the logarithm of a number in Work Register 14 is accomplished in Log Register 28 through Adder-Subtracter 162. Log Register 28 is shifted by a signal at $P_{28}$ and provides outputs to Work Register 14 via Gate 148, to one input of associated Adder-Subtracter 162 and to second input of Adder-Subtracter 162 via Gate 164 enabled by a signal at $P_{164}$. A second input to Adder-Subtracter 162 is provided by Log Store 166 via Gate 168 enabled by a signal at $P_{168}$. Log Modifier 170 may be caused to operated on a logarithm from Log Store 166 en route to Gate 168. For example, it may double the logarithm when the □ (square) Key 24 has been depressed, or halve the logarithm when the √ (square root) Key 24 has been depressed, upon the proper instruction from Control 52 over line *g*. Log Store 166 contains the logarithms to be used by the calculator, which may be read out by providing a signal at the appropriate one of lines $P_1$, $P_2$, $P_3$, $P_4$, $P_5$ and $P_6$. The specific embodiment here uses only six logarithm values, as will be discussed infra, but it is apparent that should greater accuracy be desired additional ones may be employed.

Log Store 166 stores the logarithmic values of preestablished constants which are related to the radix of the number system to be employed in the calculator and may be related to any desired base, for example the base 10. In this calculator the base *e* is employed and the constants are as follows:

TABLE IV.—LOGARITHMS AND CONSTANTS EMPLOYED

| Mode | Constant | Log |
|---|---|---|
| 1 | 10 | 2.302585093 |
| 2 | 2 | .693147181 |
| 3 | .9 | .105360516 |
| 4 | 1.01 | .009950331 |
| 5 | .999 | .001000500 |
| 6 | 1.0001 | .000099995 |

It will be noted that the last four constants are in the form 1 1/*R* where *R* is the radix and *A* is, successively, the integers 1, 2, 3, and 4. Each logarithm read out of Log Store 166, as directed by Control 52, is applied to Adder-Subtracter 168 to modify the contents of register 28 in an addition or subtraction operation, also as controlled by Control 52. Control 52 also causes the contents of Work Register 14 to be modified in multiplication and division operations by the constants. These modification operations, while coordinated, may be performed in various manners, for example at substantially the same time or one modification operation may be completed and the other then commenced and performed as a function of the first.

Add-Subtract Control 172 will condition Adder-Subtracter 162 to add if a signal is received at a $P_{LA}$ or to subtract if a signal is received at $P_{LS}$. AND circuit 174 monitors a number of stages, other than the Most Significant Digit Stage (MSD) 176, of Log Register 28 in accordance with the accuracy desired in the calculations and will respond to an all-zero input when Add-Subtract Control 172 directs subtraction and to an all-nines input when it directs addition. The output of AND circuit 174 is applied to Control 52 via line *f*.

Add-Subtract Control 172 also applies a signal to Gate 178 along with one from MSD 176. Both signals will be presented to MSD Senor 160 when Gate 178 is enabled by a signal on line *e* from Control 52 which is present when antilogarithm of a logarithm in Log Register 28 is being accumulated in Work Register 14. With Add-Subtract Control 172 directing addition MSD Sensor 160 will be conditioned to seek a one in MSD 176 while a subtract direction will condition MSD Sensor 160 to seek a zero in MSD 176.

At certain predetermined times, such as the division-by-ten operation effected in the first mode of the generation of a log of a number, Control 52 provides a signal at $P_{22}$ which causes an interrogation of the most significant position of Decimal Register 22 for the presence or absence of the decimal point which information is then communicated to Control 52. If an antilogarithm is to be assembled by the machine a signal from Control 52 will remove any decimal point in Decimal Register 22. Through Delay 180 the same signal will cause the Characteristic Transfer Gate 182 to transfer the characteristic which is in MSD stage 176 to Decimal Register 22. Decimal Register 22 is a binary coded decimal register as is Log Register 28 thus allowing for direct transfer between the two.

Program Counter 30 may receive an input from Work Register 14 via Gate 122 or from Program Counter Store 56 via Gate 184 enabled by a signal at $P_{184}$. Program Counter 30 is shifted by a signal at $P_{30}$ and stepped by a signal at $P_p$, Program Counter Store 56 is shifted by a signal at $P_{56}$. The PDS command, code 43, shown in Table III transfers the contents of Decrement Counter 32 to Decrement Counter Store 54; and transfers the contents of Program Counter 30 to Program Counter Store 56 while also transferring the numbers in the two most significant positions in Work Register 14 to Program Counter 30. The values thus removed may be replaced in Program Counter 30 and Decrement Counter 32 by employing the PDR command, code 44.

Decrement Counter 32 may receive an output from Work Register 14 via Gate 120 or from Decrement Counter Store 54 which appears through Gate 190 enabled by $P_{190}$. Values in Decrement Counter 32 may be decremented by a signal at $P_D$ and shifted by a signal at $P_{32}$. A signal destined for Decrement Counter Store 54 must pass through Gate 192 enabled by $P_{192}$; data is shifted through Decrement Counter Store 54 by signals applied at $P_{54}$.

Decrement Counter 32 is used to count the number of times an iterative operation has been performed. If, for example, a particular operation is to be carried out *M* times, the number *M* may *M* loaded in Decrement Counter 32 and decreased by one each time the operation is performed continuing the backward counting until zero remains. After each iteration "0" Sensor 194 is tested to see if the count has been reduced to zero; if a zero is not found the system is directed to begin again at the initial step of the operation.

Associated with Control 52 is Clock Pulse Source 198 which provides the signals to Distributor Circuits 196 which Control 52 directs throughout the system as enabling and shifting signals.

The calculator of the invention performs a variety of mathematical manipulations. Simple addition and subtraction operations are accomplished by accumulating the sum or difference in Accumulator 26. Other manipulations are accomplished by operating with the logarithms of the numbers involved.

The calculator of the invention performs a variety of mathematical manipulations through manual actuation of keys 18, 20, 24, 38. When the card reader 42 is connected to the calculator by means of cable 44, capability of automatic performance of a series of instructions is provided. Such automatic performance is begun by the depression of the $P_0$ key 40 which enables Gate 186 to pass the instructions received from Card reader 42 to Instruction Decoder 200. These instructions are read from Card 46 where they are recorded in 6-bit octal code. Each of the positions are individually identifiable by means of Program Counter 30. Card 46 has positions for 80 such instructions. These instructions read from Card 46 do not, as would be the case in a computer, contain an operation portion and an address portion. Rather each is composed of only an operation portion. The instruction signals are decoded by Instruction Decoder 200 and output signals are presented to Control 52 via line *k* to set Instruction Register 202.

A signal on line *n* inhibits presentation of further signals from Instruction Decoder 200 to Instruction Register 202 while an instruction is being carried out. During the execution of an instruction a signal appearing on line 1 causes Stepper 204 to advance Program Counter 30 to identify the next instruction in the sequence and actuate Card reader 42 to sense that position of Card 46. The next instruction then is decoded by Decoder 200 and output signals are available when the inhibit signal terminates.

An instruction to transfer a value from Work Register 14 to Decrement Counter 32 enables Control 52 to present a signal at $P_{208}$ and $P_D$ each time a test of O Sensor 194 does not show a zero present and to present three signals to Program Counter 30 when a zero is present. The testing of O Sensor 194 is effected by a pulse on $P_{194}$ which results in a signal on line T indicating the presence or absence of a zero. The T output of O Sensor 194 is presented to Control 52. If the T signal indicates the presence of a zero, a signal is presented to Stepper 204 on line T′ to step Program Counter three times to identify the third following position on Card 46. If the T signal indicates a zero is not present, a signal is presented at $P_{208}$ causing Stepper 208 to step Decrement Counter 32 and a signal is presented on line 1 causing Stepper 204 to step Program Counter 30. Similar test responses such as delivered by the T outputs of Registers 14 and 26 have a similar effect on Stepper 204.

Whenever Stepper 204 steps Program Counter 30 three times, it is performing a rudimentary type of branching in that a nonsequential instruction is selected. The number of times Program Counter 30 is stepped by Stepper 204 in this manner can be any number which the designer desires. But it will be obvious that this type of branching operation is not easily susceptible of being changed to meet the needs of individual series of instructions.

A second and more flexible type of branching also performed by this system utilizes principally only the number input equipment of the calculator plus a transfer instruction. A branch operation of this type requires three instructions. The first instruction enters in Work Register 14 the first of two numbers identifying the instruction to be branched to. The second instruction enters the second number identifying the instruction to be branched to. And the third instruction transfers the two numbers from Work Register 14 to Program Counter 30 (W....>PC). In this manner any instruction in a series of instructions may be identified in Program Counter 30 as the next instruction to be performed.

These two types of branching enable the calculator to perform a decisional operation. An instruction calling for a test of O Sensor 194 may be followed by two instructions to place the numbers representing a particular program step in Work Register 14 and the transfer instruction calling for a transfer from Work Register 14 to Program Counter 30. Thus, if a zero is present, Program Counter 30 will be stepped three times by Stepper 204 eliminating the intervening three branch instructions. If a zero is not present, Program Counter 30 will be stepped one instruction at a time until the address placed in Program Counter 30 by the W....>PC instruction are encountered; the next instruction followed is that specified by the number transferred to the Program Counter and may be any one present in the series of instructions in the record in the Card reader.

The performance of the calculator under control of a program and the use of the branching instruction may be better understood by means of an example of a typical program.

A program for the computation of *N* utilizes Decrement Counter 32 to control the iterative operation involved. First *N* is keyed into Work Register 14 using Numerical Keys 18. Pressing $P_0$ Key 40 will start Program Counter 30 to sequence through the program beginning at step 00. Referring to the chart of the program below, there is a loop between steps 01 and 07 to accumulate the log of the product and to keep count of the number of iterations through the loop.

TABLE VII.—EXAMPLE PROGRAM

| Step No. | Code | Command | Remarks |
|---|---|---|---|
| 00 | 30 | W⟶DC | Transfer integer N from Work Register 14 to Decrement Counter 32. |
| 01 | 31 | DC⟶W | Transfer integer in Decrement Counter 32 to Work Register 14. |
| 02 | 06 | × | Multiply the previous value in Work Register 14, by the present value (accumulating the logs of N, (N-1), . . . 2,1). |
| 03 | 45 | Decrement | Subtract 1 from Decrement Counter 32. |
| 04 | 46 | DC Test | Test Decrement Counter 32, if zero step to step 08, if not zero step to step 05. |
| 05 | 14 | 0 | Place a zero in first position of Work Register 14. |
| 06 | 15 | 1 | Place a 1 in second position of Work Register 14. |
| 07 | 27 | W⟶PC | Place 01 in Program Counter 30 as an address thus beginning another iteration. |
| 08 | 10 | LN⁻¹ | Take antilog of logarithm in Log Register 28. |
| 09 | 26 | STOP | |

Figure 7:
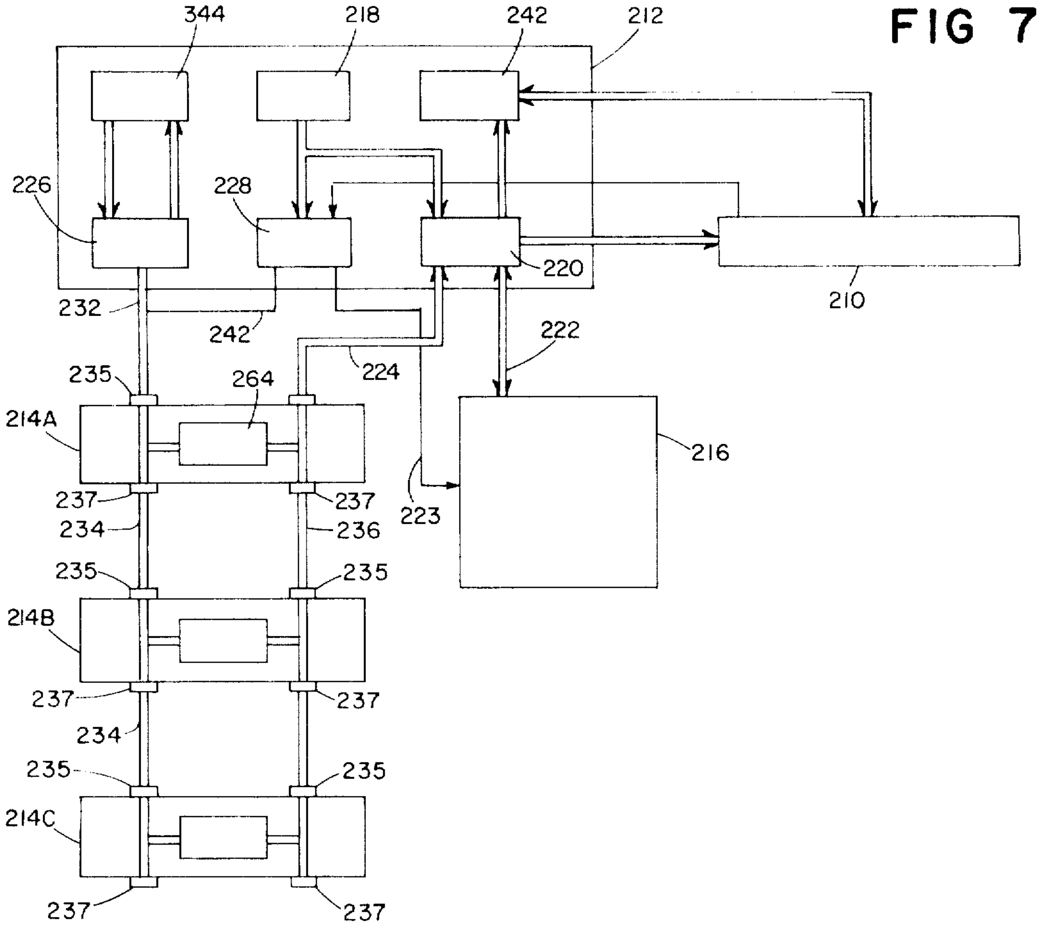
FIG. 7 is a block diagram of another form of calculator system constructed in accordance with the invention which employs three card readers.

In a second embodiment of the invention as shown in FIG. 7, a calculator 210 of the type disclosed in copending application Ser. No. 588,863, filed Oct. 24, 1966, entitled "Calculator" and assigned to the same assignee as this application is used in conjunction with a keyboard unit 212, one or more optional card reader units 214 (three card reader units being illustrated in FIG. 7) and an optional memory unit 216. The calculator unit 210 performs mathematical and data manipulating operations of the type described in connection with the embodiment shown in FIGS. 1—6 in response to single keystroke commands from the keyboard 218 (illustrated in FIG. 8). Depression of a key of this keyboard inserts a 6-bit code representing a number or an instruction into the calculator unit 210 via a 6-bit input buffer register 220. Data may be transferred between the calculator 210 and memory 216 via the buffer register 220 and cable 222. A selected card reader 214 may also enter data into the calculator via the input buffer register 220 and cable 224. A control counter 226, in conjunction with control logic 228 which responds to signals from keyboard unit 218 and calculator 210, provides control signals to the readers over cables 232 and interconnecting cables 234, which card readers in response supply signals over cables 224 and interconnecting cables 236. The control logic also responds to signals from keyboard unit 218 to provide signals over cable 223 to memory unit 216.

In program operation, the card readers 214 are turned on in sequence, one at a time, under the control of the control logic 228 by signals over cables 240. The display unit 242 in the keyboard unit responds to either signals from the calculator 210 or to signals indicative of a particular data item at a specified card reader address. The calculator 210 and keyboard unit 212 are operable alone as a basic calculator system as in the case of the calculator 10 shown in FIGS. 1—6. With the addition of the card reader logic organization, branching to a specified card reader address and return to continue the main program after a subroutine has been completed is enabled. Still greater capabilities are available with the memory unit 216 including flexible matrix manipulations.

Figure 8:
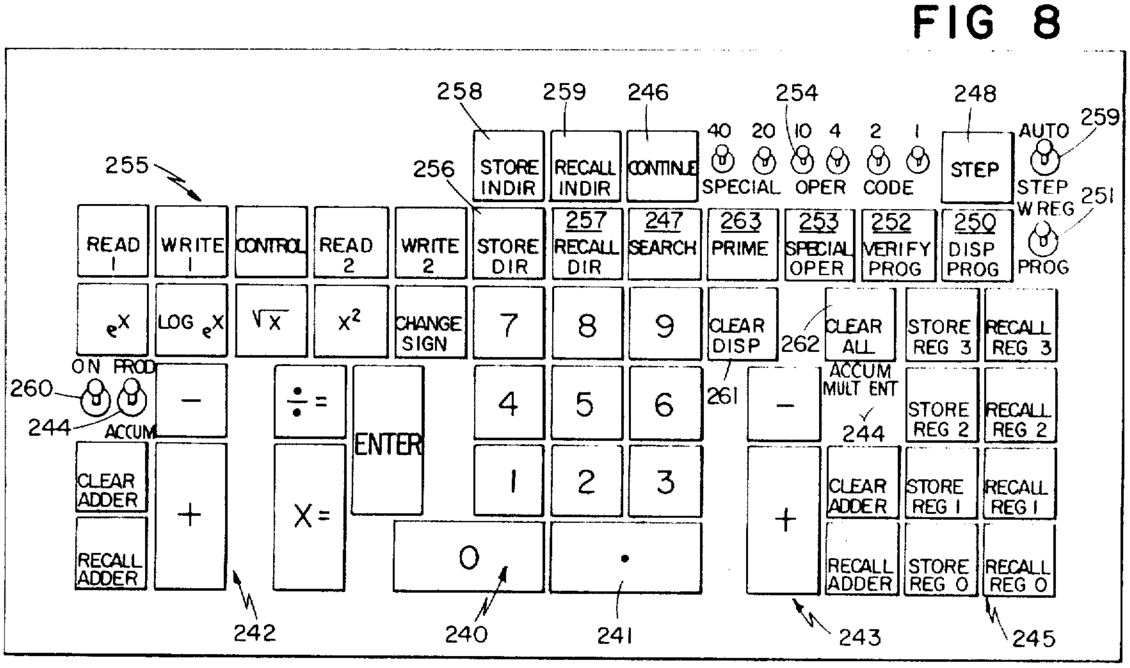
FIG. 8 is a view of the keyboard unit employed with the calculator system shown in FIG. 7.

The keyboard 218, shown in FIG. 8, includes a set of 10 numerical keys 240; a decimal point key 241; two groups of arithmetic operation control keys 242, 243 (permitting independent control of left and right adder units in the calculator 210); three arithmetic unit control switches 244 (which permit accumulation of particular data results—a feature useful in tabulating operations); a set of eight storage register control keys 245 (which control transfers between four storage registers in the arithmetic unit and the work register); a continue (start) card reader operation key 246; a search initiating operation key 247; a program counter step key 248 which is used in conjunction with switch 249; a display program key 250 which is used in conjunction with switch 251; a verify program key 252; a special operation key 253 which is used in conjunction with switches 254; input-output device control keys 255; store and recall direct control keys 256, 257; store and recall indirect control keys 258, 259; and general control switches and keys 260—263.

The following program codes, similar to those set forth in Table III, are used in this calculator system:

TABLE VIII

| Code | Command | Description |
|---|---|---|
| 01 | Stop | Stops program. |
| 02 | Search | Branch in program. |
| 03 | Search and Return | Subroutine branch. |
| 04 | Return | Return from subroutine. |
| 05 | Test Sign | Test sign of W; skip 2 steps if sign is +. |
| 06 | Continue | Continue Operation. |
| 07 | Mark | Flag for destination of search. |
| 10 | Store 0 | W⟶R0. |
| 11 | Store 1 | W⟶R1. |
| 12 | Store 2 | W⟶R2. |
| 13 | Store 3 | W⟶R3. |
| 14 | Recall 0 | R0⟶W. |
| 15 | Recall 1 | R1⟶W. |
| 16 | Recall 2 | R2⟶W. |
| 17 | Recall 3 | R3⟶W. |
| 20 | Test Overflow | Test for overflow, if any clear; skip 2 steps. |
| 21 | Control | Input/output channel 1. |
| 22 | Read 1 | Read input channel 1. |
| 23 | Read 2 | Read input channel 2. |
| 24 | Write 1 | Write output channel 1. |
| 25 | Write 2 | Write output channel 2. |
| 26 | Store Direct | W⟶Dij, directly. |
| 27 | Recall Direct | Dij⟶W, directly. |
| 30 | Test Zero | Test for 1st digit of W=0, skip 2 steps if 0. |
| 32 | Store Ind | W⟶Dij, indirectly. |
| 33 | Recall Ind | Dij⟶W, indirectly. |
| 41 | Enter | W×L⟶L, 0⟶W. |
| 42 | Log e× | Log (L×W)⟶W, 1⟶L. |
| 43 | e× | L×EXP (W)⟶W, 1⟶L. |
| 44 | √× | L×√W⟶W, 1⟶L. |
| 45 | ×² | L×W²⟶W, 1⟶L. |
| 46 | ×= | L×W⟶W, 1⟶L. |
| 47 | ÷= | L/W⟶W, 1⟶L. |
| 50 | Clear $A_R$ | O⟶$A_R$, W unchanged. |
| 51 | Recall $A_R$ | $A_R$⟶W, $A_R$ unchanged. |
| 52 | +$A_R$ | $A_R$+W⟶$A_R$ and W. |
| 53 | −$A_R$ | $A_R$−W⟶$A_R$ and W. |
| 54 | Clear $A_L$ | O⟶$A_L$, W unchanged. |
| 55 | Recall $A_L$ | $A_L$⟶W, $A_L$ unchanged. |
| 56 | +$A_L$ | $A_L$+W⟶$A_L$ and W. |
| 57 | −$A_L$ | $A_L$−W⟶$A_L$ and W. |
| 60 | 0 | Adjoin "0" to W. |
| 61 | 1 | Adjoin "1" to W. |
| 62 | 2 | Adjoin "2" to W. |
| 63 | 3 | Adjoin "3" to W. |
| 64 | 4 | Adjoin "4" to W. |
| 65 | 5 | Adjoin "5" to W. |
| 66 | 6 | Adjoin "6" to W. |
| 67 | 7 | Adjoin "7" to W. |
| 70 | 8 | Adjoin "8" to W. |
| 71 | 9 | Adjoin "9" to W. |
| 75 | . | Fix decimal point. |
| 76 | Clear Disp | 0⟶W. |
| 77 | Change Sign | −W⟶W (Sign of W). |

Where: W=Work Register; L=Log Register; $A_L$=Left Adder; $A_R$=Right Adder; R=Storage Register; D=Memory Register.

Figure 9:
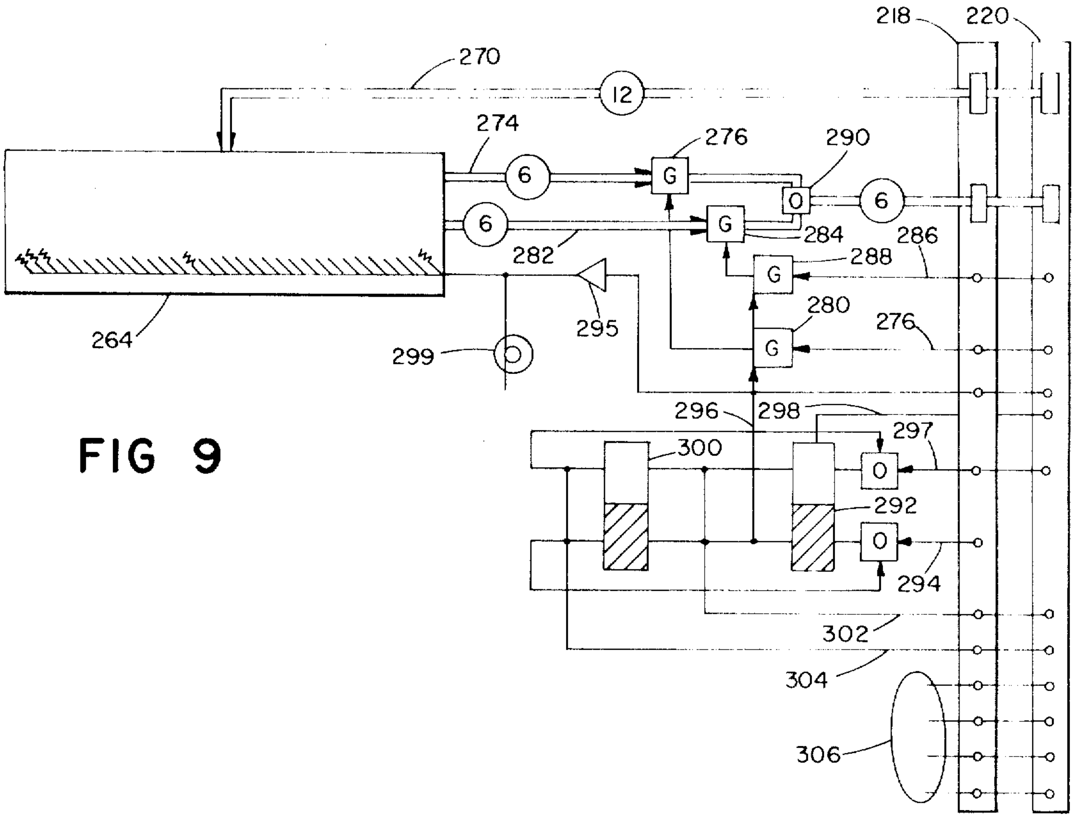
FIG. 9 is a logic diagram of one of the card readers shown in FIG. 7.

A logic diagram of the card reader 214 is shown in FIG. 9. Input and output signals to the card reader are applied through pluggable connections 235 for control of reading a card disposed in the card reader. The card reader, in the card allow selective completion of circuits in the diode matrix 264. Input addressing signals from the counter 226 are applied over 12 conductors 270 to the diode matrix. Output lines 274 from the upper section of the matrix are connected to gate 276 which is conditioned by a signal over input line 278 from the reset side of the most significant stage of the program counter 226 as passed by control gate 280. Similarly, output lines 282 from the lower section of matrix 264 are connected to gate 284 that is conditioned by the set signal from the most significant stage of the program counter 226 via line 286 as passed by control gate 288. The signals passed by the conditioned gate 276 or 284 are passed by OR circuit 290 for application over cable 224 to the input register 220.

The operation of each card reader is under the control of a main flip-flop 292 which is set in response to a signal on line 294 and in set condition produces an output level on line 296 to condition gates 280 and 288 and is also applied through amplifier 295 to light indicator lamp 299 and to energize the anode resistors 265 of the diode matrix 264 so that that matrix will produce output signals in response to addressing signals from the program counter 226. Flip-flop 292 is reset by a signal on line 297 and this resetting operation produces an output pulse on line 298 which is applied to the output connector unit 237 for application via cable 234 to the input line 294 in the control unit of the next card reader in the sequence. Also included in the control circuit is a storage flip-flop 300 which stores the setting of flip-flop 292 in response to a signal on line 302. The setting stored in flip-flop 300 is returned to flip-flop 292 in response to a signal on line 304. In addition, power supply signals are applied to the card reader over the four conductors in group 306. It will be noted that all of the pluggable connections at input connector 235 are connected to output connector 237 with the exception of the flip-flop setting signal on line 294 (which is applied only to the input connector 235) and the output signal on line 298 (produced on resetting of flip-flop 292) which is applied only to the output connector 237.

The card readers employed in this system are similar to the card readers 42 and receive similar cards 46. Other types of record receiving devices of course may be utilized in the practice of the invention. The diode matrix 264 (divided in upper and lower sections) is housed within the base component 62 and decodes the address signals applied on lines 270 and applies the decoded signals to output lines 274, 282 as a function of the holes in the card positioned in the reader. It will be seen that corresponding address in the upper and lower sections of the card produce output signals on output lines 274, 282 simultaneously and the desired group of output signals is selected on the basis of the state of the most significant stage of the program counter 226 for application through OR circuits 290 and over cable section 224 to the input register 220. The principal differences between the card reader shown in FIGS. 1—3 and the card readers employed in this embodiment are the incorporation of the control logic, a provision of output pluggable connectors, and provision of an indicator element 299 on the card reader housing.

Figure 10:
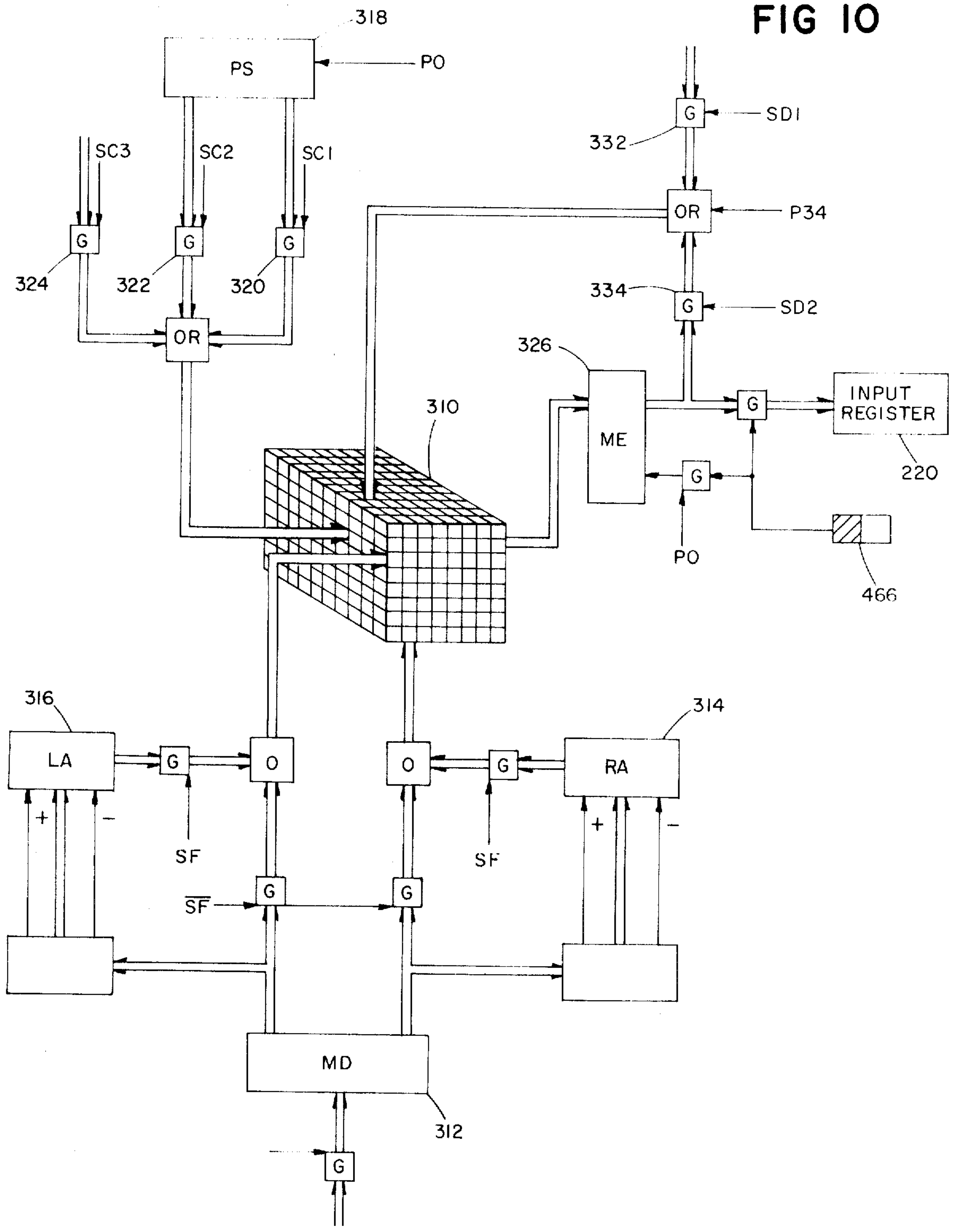
FIG. 10 is a logic diagram of the optional memory unit employed in connection with the calculator system shown in FIG. 7.

A logic diagram of magnetic core memory unit 216 is shown in FIG. 10. That memory includes 64 registers of 12, 4-bit digits arranged in an eight by eight matrix as indicated at 310. Register addressing is direct in accordance with the setting of the MD register 312 or indirect in accordance with the setting of column counter 314 and row counter 316. Digit addressing is under the control of a PS counter 318 which is read directly through gates 320 or in complement through gates 322; or in response to a calculator address via gates 324. The output windings are connected to an ME buffer register 326 for subsequent signal transfer over lines 222 to input register 220. Data signals for a store operation are applied over cable 222 through gate 332; and when information is being rewritten into the cores in a read operation, gates 334 are energized to select appropriate inhibit lines.

The PS counter 318 is stepped by a $P_0$ pulse; the MD register is gated by a control pulse from the control logic 228 via the connector cable 223; and the output signals in the ME register 326 are gated to the input register by a control level over cable 223.

Figure 11:
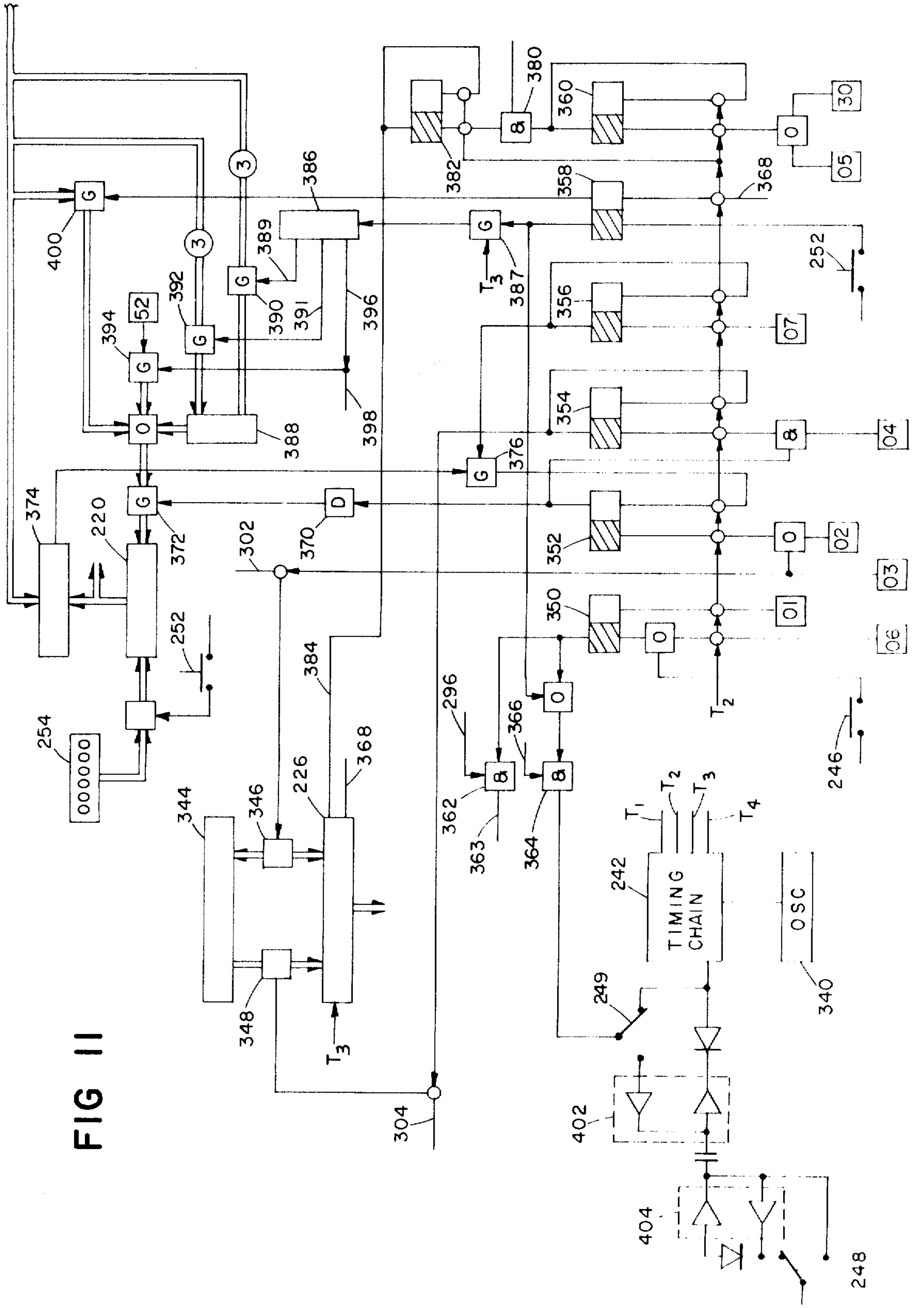
FIG. 11 is a logic diagram of a portion of the logic included in the keyboard unit in the calculator system shown in FIG. 7.

A schematic diagram of the program control portion of the control logic 228 is shown in FIG. 11. That control logic is responsive to either codes in input register 220 or keystrokes of the keys in the keyboard 218. Oscillator 340 applies outputs to timing chain circuit 342, which circuit produces a series of output pulses T1—T4 that synchronize the channeling of information to and from the calculator 198 between the card readers 214 and the keyboard 218. A storage register 344 is connected to receive the contents of counter 226 via gates 346 and to return the stored contents to the counter 226 via gates 348. A series of control flip-flops are included in the control logic including a main control flip-flop 350, a search control flip-flop 352, a return control flip-flop 354, a mark control flip-flop 356, a verify program control flip-flop 358, and a test control flip-flop 360. In general, the control flip-flops are actuated by gating a signal at T2 time for synchronization purposes. The counter 226 is stepped by the trailing edge of a T3 pulse and the input register 220 is normally cleared in each cycle in response to a T3 pulse.

In response to depression of key 246, flip-flop 350 is set. (This flip-flop is also set in response to a continuous code 06). An output level is generated applied to AND circuit 362 and if no card reader is on (indicated by an absence of a signal on line 296 indicative of the set condition of a flip-flop 292), an output signal is applied on line 363 which is applied via cable 232 and line 294 to set the control flip-flop 292 in the first card reader 214A. The setting of the control flip-flop 350 also conditions AND circuit 364 and if the calculator not busy signal is present on line 366, the AND circuit has an output which is applied through switch 248 to enable the timing chain 342 to step in response to oscillator 340 and produce the series of timing pulses T1—T4. In response to each T2 pulse, the control flip-flops 350—360 are sampled; in response to the T3 pulse the input register 220 is cleared; and in response to the trailing edge of each T3 pulse, the seven stage counter 226 is stepped. Thus in normal operation, the output signals of counter 226 are applied over cable lines 232 to the card reader input lines 270, 278, and 286 to energize a particular address from which a data item is read out through OR circuit 290 to set the six flip-flops in the input register 220. The calculator responds to the contents of the input register, stopping the timing chain 342 where necessary. When the calculator operation is complete, the timing chain resumes generation of output pulses and the program counter 226 continues to step through its 80 steps or until a stop code 01 is detected. When the stop code is detected, the main control flip-flop 350 is turned off in response to the T2 pulse. If no stop code is detected, the program counter steps through the 80 card reader addresses and at the last address produces an output pulse on line 368 which is applied over cable 232 to clear all the card reader control flip-flops 292 via line 297. The set flip-flop 292 produces an output transition in response to this clearing signal on line 298 which is applied via output connector transition cable 234 to the input line 294 of the next card reader to set its control flip-flop 292 and energize its diode decoding network and readout circuits. As the counter 226 is in reset condition, the data item stored at the first address of the second card reader 214B is read into the input register 220 for control of the calculator 210.

This calculator system can also execute subroutines in response to data items coded on the cards 46. A search code 02 or search and return code 03 initiates a search for the data item specified in the next address of a program following the search code. That data item is held in the input register 206 and a search for a mark code 07 is made with the data item following each detected mark code being compared with the data item held in the input register. On comparison the search operation is terminated and program operations resumed from that point. With reference to FIG. 11, in response to either a search or search and return code flip-flop 352 is set at T2 time removing a conditioning level (after a one cycle synchronizing delay diagrammatically indicated by 370 effective only to delay removal of the conditioning level), from gate 372 so that the data item following the search and return code is held in the input register 220. The program counter 226 continues to be stepped however and in each cycle the contents of the input register 220 are compared by comparator 374 with the data item at the sensed card reader address. When a mark code 07 is sensed flip-flop 356 is set, conditioning gate 376. The flip-flop 356 is cleared automatically in the next cycle so that if comparator 374 does not produce an output which is passed by gate 376, the search continues. If however a comparison was made, search flip-flop 352 is cleared at T2 time permitting clearing of the input register 220 and reading of subsequent data items into it to continue execution of the program from the program address then specified by counter 226.

If the search and return code 03 was decoded, in addition to setting flip-flop 352, gate 346 is conditioned to store the contents of the program counter 226 in storage register 344 and also signals are passed on lines 302 (via cable 232) to store the setting of card reader control flip-flops 292 in their storage flip-flops 300. When a return code 04 is detected (after completion of a search operation) flip-flop 354 is set, conditioning gate 348 to reset program counter 226 to its previous address and via cable 232 and lines 304 resetting all the card reader control flip-flops 292 to their previous settings so that the program is immediately returned to the address following the search code that initiated the branch in the program. The flip-flop 354 is automatically reset in the next cycle of the timing chain 342. Thus a branch operation is initiated by the setting of flip-flop 352 (in response to codes 02 or 03 or depression of key 244 followed by keying of any other code into register 220). The data item following the setting of flip-flop 352 is stored in register 220, all calculator operations cease, and the program counter 226 is stepped at regular intervals to sequence through the program specified by the cards 46 in readers 202. As each mark code 07 is detected, flip-flop 356 is set, conditioning gate 376. If the next data item read from the program compares satisfactorily with the data item stored in register 220, flip-flop 352 is reset and the program resumes calculator control from that point. Should a satisfactory comparison not result the search will continue with flip-flop 352 remaining set and flip-flop 356 being cleared. The sequence is repeated at each mark code 07 until a satisfactory comparison is made at which point calculator operations resume. When a return code 04 is detected the program counter 226 and the card readers 215 are immediately reset to the address following a branch (search and return) code that was previously decoded. The logic thus permits the calculator to perform subroutines with branch addresses identified by data items.

A conditional branch operation is produced in response to a test code, for example, the test sign code 05 tests the sign of the work register in the calculator 210 and the test zero code 30 tests the first digit in the work register. Either code sets flip-flop 360. If the specified condition (sign positive or first digit is zero) is detected, the second input of AND circuit 380 is conditioned and flip-flop 382 is set producing a conditioning output on line 384 to step the program counter 226 two additional steps to effectively skip two instructions. Both flip-flops 360 and 382 are cleared by the next T2 pulse.

Other operations permitted by keyboard controls includes insertion of a particular code specified by the setting of switches 258 into the input register 206 in response to depression of button 256. In a program check operation the circuits, including the program counter 210, are cleared by depression of the prime key 263; and in response to depression of push-button 254, control flip-flop 358 is set. In this mode a decimal addition of all the octal data items on a card is made and displayed on the display unit 242. In sequence, logic unit 386 (conditioned by set flip-flop 358 and gate 387) causes the three most significant bits of the first data item code to be converted to octal form by encoder 388 and entered into the calculator as an octal entry in response to output 389 of logic unit 386 which conditions gate 390; the three least significant bits of that data item code to be converted to octal form and entered into the calculator as a second data entry in response to output 391 which conditions gate 392; and these two numbers are added to the contents of the work register in the calculator by a decimal add code 52 applied via gate 394 conditioned by output 396. The operative card reader 214 is then stepped (line 398) and the data entry sequence is repeated. During this operation the normal input register input channel is blocked as gate 400 is inhibited and the octally encoded portion of data items and the add codes are transferred through the input register and entered into the calculator at each T2 time. The input register 206 is reset at each T3 time but the program counter 226 is stepped only every third cycle. This sequence continues for 80 steps, the output signal from counter 226 on line 368 causing the control flip-flop 358 to be cleared and terminating this verifying program operation with the decimal sum of the octal codes (contents of the calculator's work register) displayed by display unit 242.

Thus the verifying operation provides a check on the accuracy of the program on the card and after that accuracy has been established, the proper placement of the record 46 in the reader 214. For example, if one of the contacts in the card reader 214 had not been completed where a hole was punched in the card, the sum displayed by display unit 242 would not correspond with the predetermined sum, thus providing an immediate indication of fault.

When the switch 249 (shown in FIG. 11 in automatic position) is in its other (step) position, automatic stepping of the timing chain 342 is interrupted by removal of the conditioning level applied by AND circuit 364. That conditioning level is applied to flip-flop 402 and the card reader and other components may be operated for one step by depression of key 248 which applied a stepping signal through synchronizing flip-flops 404 and 402 to permit the timing chain 342 to generate one sequence of control signals T1—T4.

Figure 12:
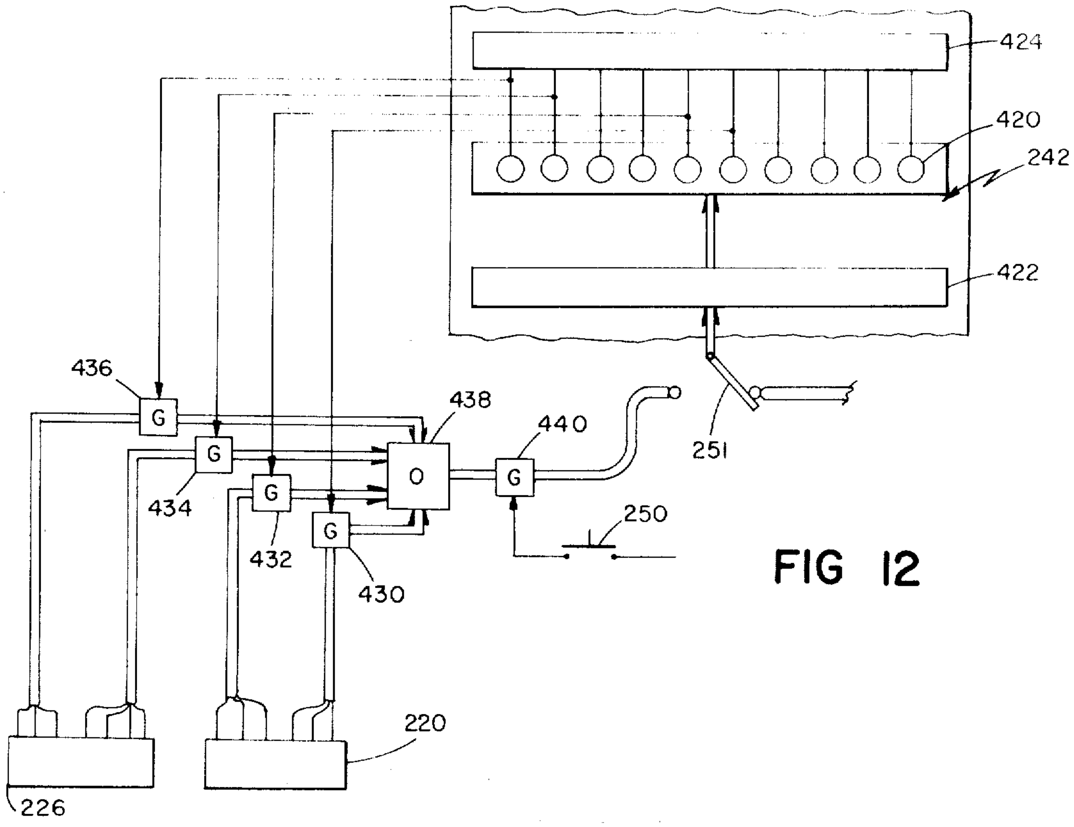
FIG. 12 is a block diagram of another portion of the logic included in the keyboard unit of the calculator system shown in FIG. 7.

Another operation that is permitted by the keyboard controls responds to key 250 when switch 251 is in the display program position. Normally switch 251 is in the display work register position and displays the contents of the work register in calculator 198. An understanding of details of the display unit 224, as indicated in FIG. 12, may be had with reference to FIG. 14 and the corresponding description in the copending application Ser. No. 588,863. As there described, this display unit includes a series of indicator tubes 420, in which the corresponding cathodes of all of the indicator tubes are energized simultaneously in accordance with information from encoder 422 (which is normally supplied with information from the calculator 210 via switch 251) and the one anode corresponding to a particular digit position whose data is supplied to encoder 422 is energized in accordance with the output of decoder 424. The data applied to encoder 422 and the indicator tube anodes are energized sequentially in a scan pattern that is sufficiently rapid so that the full number appears to be continuously displayed. Associated with this circuitry are four gates 430—436, an OR circuit 438 and a gate 440. Connected to the conditioning inputs of gate 430 and the three least significant stages of input register 220; and connected to the conditioning inputs of gate 432 are the three most significant stages of register 220. Similarly connected to the conditioning inputs of gate 434 are the four least significant stages of counter 226; and connected to the conditioning inputs of gate 436 are the three most significant stages of that counter. Gate 430 is sampled at the fifth digit position display time; gate 432 is sampled at the sixth digit position display time; gate 434 is sampled at the ninth digit position display time; and gate 436 is sampled at the tenth digit position display time. The outputs of the gates 430—436 are applied through OR circuit 438 to gate 440 which is conditioned when key 250 is depressed. With switch 251 in the display program position, this octal data is applied to the binary decimal decoder 422 and the decoded output is applied to all of the cathodes of the indicator tubes 420. The information channeled by encoder 422 is displayed only by the indicator tube 420 whose anode is energized at that time, however. Thus in this mode the setting of counter 226 and the data item in the instruction sequence specified by the card 46 in the operative card reader 214 (via input register 220) is displayed in octal form by display unit 242.

Figures 13, 14, 16:
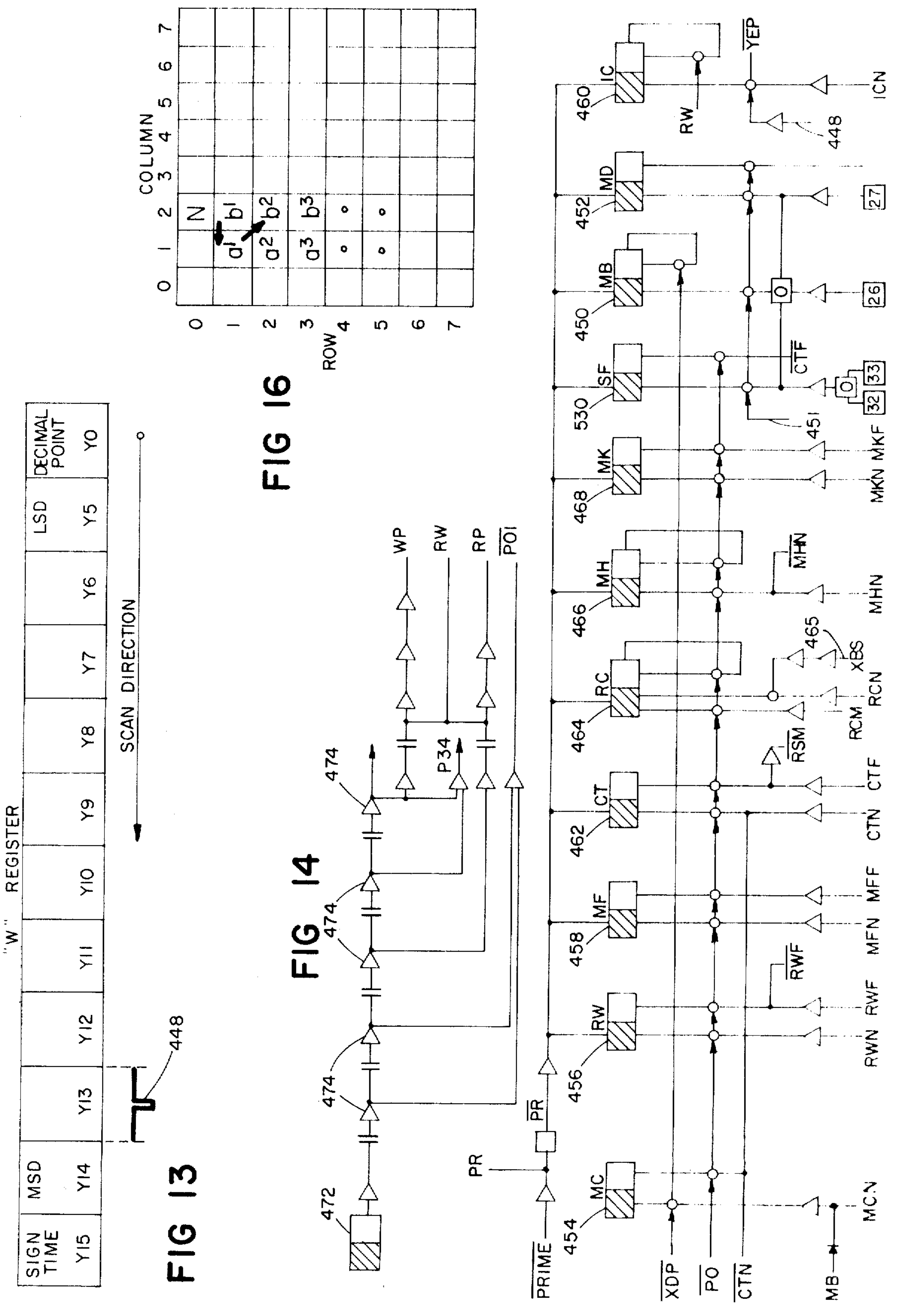
FIG. 13 is a diagram of the format of a data word as stored in the calculator system.
FIG. 14 is a logic diagram of a portion of the logic included in the memory control unit of the calculator system shown in FIG. 7.
FIG. 16 is a diagram of the memory unit, showing an example of the storage of data for use in a matrix manipulation.

Data is stored in memory 216 in the same format as stored in the W register of the calculator or the keyboard display 242, that format being indicated in FIG. 13. The word in the display mode is scanned from right to left, that is from the least significant digit to the most significant digit. Each digit time is 560 microseconds and a 20-microsecond sync pulse 448 is generated in the center of each digit time. In storing a word in memory, the bits are stored in the same format as they would be normally entered via the keyboard, each digit being represented by four bits.

Figure 15:
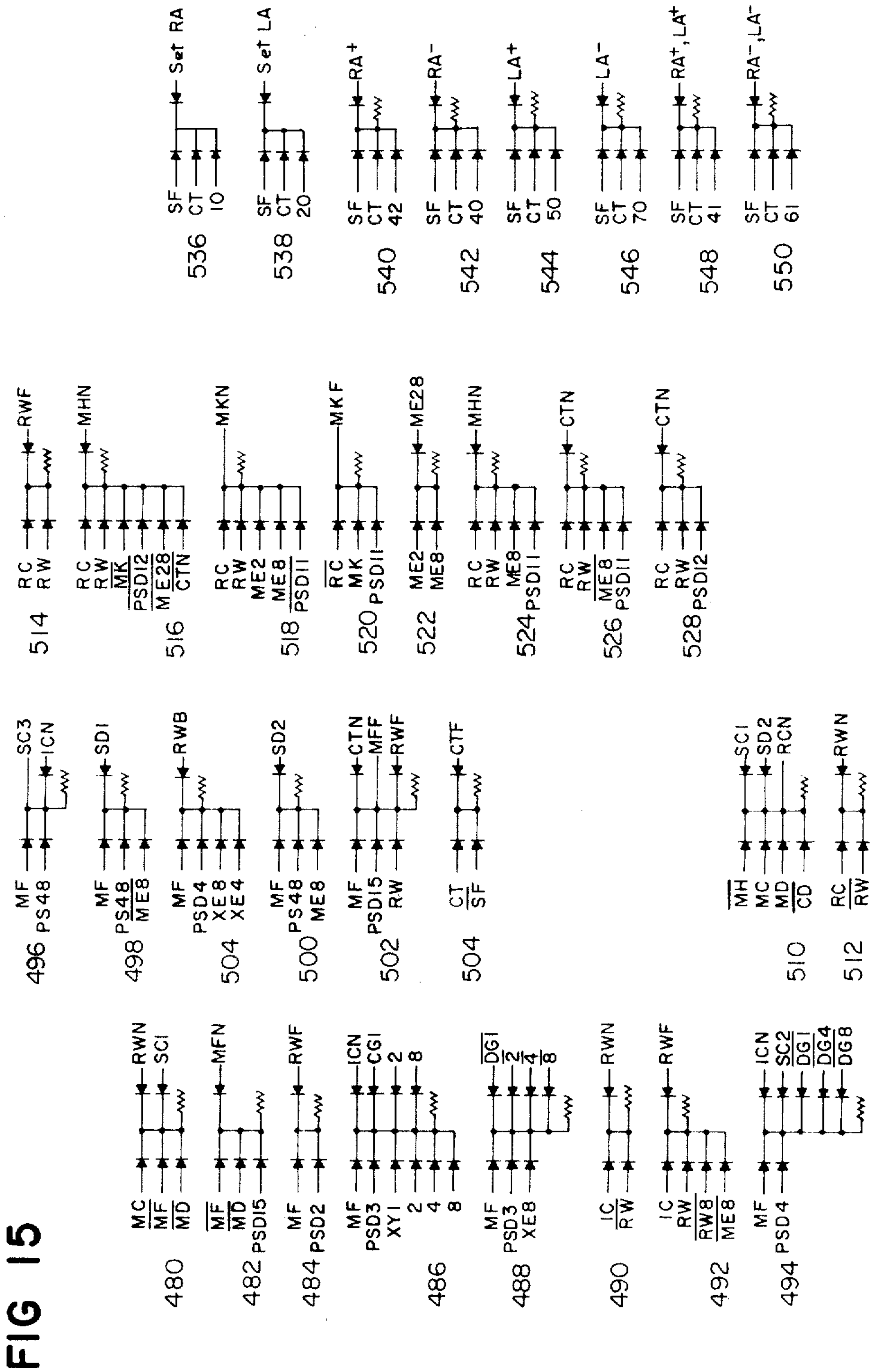
FIG. 15 is a logic diagram of decision circuitry employed with the memory logic shown in FIG. 14.

With reference to the schematic diagrams of FIGS. 14 and 15, the memory control circuitry includes control flip-flops 450, 452, 454, 456, 458, 460, 462 and 464, and logic shown in FIG. 15 operates these control flip-flops in response to input signals. A P sequencer 470 includes oscillator 472 which is free running at approximate frequency of 20—25 kHz. and five units 474 so that in each cycle an entire pulse train of five pulses $P_0$—$P_4$ is generated. When flip-flop 456 is set, the $P_2$ pulse is gated as a read pulse and the $P_4$ pulse is gated as a write pulse.

Two commands are generated in a store operation, the store command 26 and a 6-bit address code. Command 26 conditions flip-flop 450 which is set when a control pulse on line 451 is received from control unit 228. The next 6-bit code is then gated into the address register 312, 100 microseconds after that code is present in input register 220 and then the memory control flip-flop 454 is set which interrupts further operation of the calculator 210, keyboard 218 and card readers 214 until the memory operation is complete. AND circuit 480 (FIG. 15) then generates the RWN signal so that flip-flop 456 is set by the $P_0$ pulse from the P sequencer 470. An SC1 signal is also generated to condition via gate 320 (FIG. 10) the real outputs of the digit addressing counter 318. That counter is stepped in response to each $P_0$ pulse and as no D signal is present (neither gate 332 or 334 conditioned), each core digit is cleared.

When counter 318 has stepped through the digit addresses to PSD15 AND circuit 482 produces an output so that the next $P_0$ pulse will set flip-flops 458. With flip-flop 458 set AND circuit 484 produces an output to allow the $P_0$ pulse occuring at PSD2 time to clear flip-flop 456. That same $P_0$ pulse steps counter 318 to PSD3.

AND circuit 486 conditions flip-flop 460 to synchronize the keyboard display with the memory and addresses the sign digit position of the addressed register in memory 310. If the sign of the work in the work register is negative AND circuits 488 and 490 cause all ones to be written into the sign position of the addressed register.

The next $P_0$ pulse resets flip-flop 456 and steps counter 318 to PSD4. In this digit time the decimal point value is stored in the digit location corresponding to the decimal point address for this number that is stored in the calculator 210, AND circuit 494 generates the decimal point code and synchronizing flip-flop 460 is turned on which in turn sets control flip-flop 456 at $P_0$ time. The decimal point address data stored in the calculator is used as an address through conditioning of gates 324 and in that memory cycle the decimal point code is written into that address.

The read-write cycle is the same for each subsequent digit time, that is, synchronizing flip-flop 460 is set by the sync pulse 448 from the calculator scan which allows control flip-flop 456 to set at the next $P_0$ time. After the read-write portion of the cycle is complete AND circuit 492 resets control flip-flop 456 at the same time that the counter 318 is stepped. For the least significant digit, AND circuit 494 sets synchronizing flip-flop 460 and conditions the complement address of counter 318. Data is selected by AND circuit 496. When the register digit where the decimal point code has been written is sensed, AND circuit 500 switches the data selection from gate 332 to gate 334 so that the code is rewritten back into the same position. Flip-flop 456 is not reset as AND circuit 492 is inhibited by the ME8 signal, counter 318 is stepped and the data from that work register digit is written into memory through gate 332 in the next memory cycle. This read-write cycle continues until counter 318 steps to position 15 at which time AND circuit 502 sets continue flip-flop 462, terminating the memory operation and allowing other calculator operations to proceed. AND circuit 504 is provided to block the resetting of the control flip-flop 456 if no decimal point code has been stored in this memory register so that counter 318 is allowed to step to position 15.

The recall mode is similar, the code 27 setting flip-flops 450 and 452. The address code is set into the address register 312 by the pulse 451 and the memory control flip-flop 454 is set. The setting of the MD flip-flop 452 generates a clear display code to clear the work register in the calculator 210 and display 242.

AND circuit 510 generates the $SC_1$ and $SD_2$ levels to select direct addressing of counter 318 through gates 320 and rewrite circuitry through gates 334. In addition auxiliary flip-flop 464 is set as soon as the clear display operation is complete, that completion being signalled by the calculator control signal on line 465. AND circuit 512 then allows control flip-flop 456 to turn on at $P_0$ time and the contents of the digit address specified by sequencer 318 are read into the output buffer register 326 and then rewritten into that digit address. Due to AND circuits 514 and 516 the control flip-flop 456 is turned off and readout flip-flop 466 is turned on at the next $P_0$ pulse at the time the counter 318 is advanced and the contents of the ME register 326 are read out to the input register with the automatic addition of 60 to generate the proper code representing that numerical value. The next $P_0$ pulse resets readout flip-flop 466 and buffer register 326. The readout cycle is then repeated with respect to the next digit position and this sequence repeats until the 10 digits, decimal point and sign have all been entered into the work register of the calculator 210. When a blank code (indicative of no data) in a digit place in the memory is detected, AND circuit 522 produces an output and blocks the output of AND circuit 516, preventing transfer of that code to the work register of the calculator. Similarly, AND circuit 524, in response to detection of change sign signal at PSD 11 time, turns on flip-flop 466 to transmit that sign information to the calculator. At PSD 12 time the recall mode is complete and the continue flip-flop 462 is set by AND circuit 528. A resume signal is transmitted to the calculator as a result of the reset signal applied to the continue flip-flop 462, control flip-flop 454 is cleared. In the next cycle the continue flip-flop is cleared by the output of AND circuit 504. (It will be noted that this readout cycle transmits the individual digits, decimal point and sign information in the same order that they would have been entered into the work register of the calculator via the keyboard, due to the format in which that information was stored in the memory.)

In the indirect addressing mode (codes 32 and 33), the row and column counters 314, 316 are used. In response to a store indirect code 32 or a recall indirect code 33, control flip-flop 530 is set, as well as memory control flip-flop 450. The next code is entered into register 312, but rather than identifying a memory address directly, it is used to change the settings of one or both counters. This next code may be used to initially set one of the counters, the value of the first three bits indicating the counter to be set and the last three bits providing the setting of the counter (during which operation no word is read out of memory) or one or both of the counters may be stepped either positively or negatively to change the counter setting for identifying the address of the next data word to be read out in this indirect addressing mode (a data word being read out or read in prior to stepping of the counters in this mode). For example, if the first three digits following an indirect instruction is 10, the counter 314 is set to the value of the last three digits and similarly if the value of the first three digits is 20, the row counter 316 is set to the value of the last three digits in the instruction. If the instruction value is 40, the column counter is stepped one in the positive direction; if the instruction value is 41, both the row and column counters are stepped one in the positive direction; if the value is 50, the row counter is stepped one in the positive direction; if the valve is 60 the column counter is stepped one in the negative direction; if the value is 61 the both counters are stepped one in the negative direction; and if the value is 70 only the row counter 316 is stepped one in the negative direction. It will be understood that this reversible mode of operation may be accomplished either by stepping a counter one in the negative direction or stepping the counter a fixed predetermined number of steps in the forward direction to reach the same value.

In a memory access cycle in the indirect mode, the data word at the register address specified by the settings of the two counters is transferred to the work register. In the next cycle the settings of the one or both of the counters is changed as described above. After the store or recall cycle is completed as indicated by the setting of the continue flip-flop 462, the next $P_0$ pulse clears the control flip-flop 530 and other calculator operations continue.

An example of the type of mathematical manipulation which may be performed with this expanded computer system employing a card reader and this type of memory unit would be $$\frac{2}{n}(\underline{a}\cdot\underline{b}) \text{ where } (\underline{a}\cdot\underline{b}) = \begin{bmatrix} a1 \\ a2 \\ a3 \\ \cdot \\ \cdot \\ \cdot \\ a_n \end{bmatrix} \cdot \begin{bmatrix} b1 \\ b2 \\ b3 \\ \cdot \\ \cdot \\ \cdot \\ b_n \end{bmatrix} = \sum_{i=1}^{n} a_i b_i$$

The elements of Vector *a* are stored in column 1 of the memory as indicated in FIG. 16; the elements of Vector *b* are stored in column 2; and the value N is stored at address 02. A short program to perform this manipulation (indicated below) first sets the row and column counters to the address 12—(the address of $b_1$); the left and right adders are then cleared and the value N stored at address 02 is stored as a negative value in the right adder as a count of the number of times the multiplication subloop is to be repeated. That multiplication of the values $a_1b_1$ is then performed and the resulting value is added to the contents of the left adder; the loop count is updated and the sign of the right adder is checked as a test to branch out of the multiplication loop. When the right adder value is no longer negative, the program branches out of the subloop by skipping two instructions and the contents of the left adder are summed (effectively doubling that value); the value N is recalled; and a division operation is performed to provide the answer. The last step in the program is a stop instruction as the mathematical manipulation is completed.

Such a short program utilizing this computer system is as follows:

| Comments | Step | Operation | Code |
|---|---|---|---|
| | 00 | Mark | 07 |
| Search tag | 01 | 5 | 65 |
| | 02 | Recall Ind. | 33 |
| | 03 | Set Col. 2 | 02 |
| Set counters 314 and 316 to D21 | 04 | Recall Ind. | 33 |
| | 05 | Set. Row 1 | 21 |
| Clear Left Adder | 06 | Clear $A_L$ | 54 |
| | 07 | Clear $A_R$ | 50 |
| | 08 | Recall Dir. | 27 |
| Set up loop count in Right Adder | 09 | D02 | 02 |
| | 10 | $-A_R$ | 52 |
| | 11 | Mark | 07 |
| | 12 | 6 | 66 |
| | 13 | Recall Ind. | 33 |
| Loop to sum $a_ib_i$ and add to Σ in Left Adder. Set counters 314, 316 for next multiplication. | 14 | Col.− | 42 |
| | 15 | Enter | 41 |
| | 16 | Recall Ind. | 33 |
| | 17 | Row Col.+ | 60 |
| | 18 | ×= | 46 |
| | 19 | $+A_L$ | 56 |
| | 20 | 1 | 61 |
| Update count in $A_R$ and test for end of loop. | 21 | $+A_R$ | 52 |
| | 22 | Sign? | 05 |
| | 23 | Search | 02 |
| Repeat loop | 24 | 6 | 66 |
| | 25 | Recall $A_L$ | 55 |
| | 26 | $+A_L$ | 56 |
| $\frac{2}{n}(\Sigma a_ib_i)$ | 27 | Enter | 41 |
| | 28 | Recall Dr. | 27 |
| | 29 | D02 | 02 |
| | 30 | ÷= | 47 |
| | 31 | STOP | 01 |

As indicated, a product of the number stored in columns 1 and 2 of each row is generated and the resultant product is summed into the left adder. After each multiplication operation, the valves of both counters are 314, 316 are increased by one. The contents of the right adder is tested after each summing operation and if the sign remains negative another multiplication operation is repeated; but when the sign of the contents of the right adder changes, steps 23 and 24 are skipped to branch out of the subroutine, the value stored in the left adder is doubled and that doubled value is divided by N.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention as defined in the claims.

We claim:

1. An expandable electronic calculator system comprising:

an arithmetic unit for processing numerical values in accordance with instructions, a keyboard unit having a plurality of manually actuable control elements including ten manual control keys representing numerical values from 0 through 9, a plurality of manual control keys representing instruction values, and logic responsive to operation of said keys for generating codes, each code having the same number of digits and representing either a numerical value or an instructional value, buffering means for transferring said numerical and instructional data codes from said keyboard unit to said arithmetic unit, said buffering means including input terminal means for pluggably connecting optional data handling equipment to said calculator system to increase the capacity and capabilities thereof, and interlock means responsive to signals from said keyboard unit and said arithmetic unit for coordinating the operation of optional additional equipment connected to said calculator system via said input terminal means with the operation of said arithmetic unit.

2. The calculator system as claimed in claim 1 wherein said optional equipment includes a data storage unit adapted to be pluggably connected to said input terminal means and operable in response to an instruction code from said keyboard unit for transferring data between said storage unit and said arithmetic unit.

3. The calculator system as claimed in claim 2 wherein said data storage unit includes a multiplicity of registers arranged for coordinate addressing and further including two counters coupled to said data storage unit, each said counter being effectively arranged to be stepped up or down for selectively addressing a register for a data transfer, and control responsive to a single instruction code for stepping both counters to change their settings and select a different register for data transfer purposes.

4. The calculator system as claimed in claim 2 and further including data storage unit control connected to said data storage unit and responsive to a two code sequence, said control including means responsive to a first code for controlling the direction of data transfer between said data storage unit and said arithmetic unit and means responsive to the second code for selecting the address of a register in said data storage unit for a data transfer.

5. The calculator system as claimed in claim 4 wherein said data storage unit control includes two counters, each of which can be effectively stepped up or down for selectively addressing a register for a data transfer and said means responsive to said second code controls the stepping of said two counters.

6. The calculator system as claimed in claim 1 wherein said optional equipment includes a record reader adapted to receive a record defining a sequence of codes for the control of said arithmetic unit, logic for effecting transfers between said record reader and said buffering means in response to an instruction code from said keyboard unit, control means for actuating said record reader to generate, in response to the record disposed therein, a series of codes to cause said arithmetic unit to perform a series of steps, and branch logic responsive to a first predetermined code on a record in said record reader for actuating said control means for search through said sequence of codes on the record for a particular code identified by said control means and to cause the calculator system to branch so that the arithmetic unit next responds to the series of codes on the record following said predetermined code.

7. The calculator system as claimed in claim 6 wherein said control means includes means responsive to the code immediately following said predetermined code to identify said particular code.

8. The calculator system as claimed in claim 6 wherein said branch logic further includes means responsive to a second predetermined code on the record in said record reader for causing the calculator system to branch and return to process a series of codes on the record following said first code.

9. The calculator system as claimed in claim 6 and further including means in said branch logic conditionally responsive to an output of said arithmetic unit.

10. The calculator system as claimed in claim 6 wherein said optional equipment further includes a data storage unit adapted to be pluggably connected to said input terminal means and operable in response to an instruction code from said keyboard unit for transferring data between said storage unit and said arithmetic unit.

11. The calculator system as claimed in claim 10 and further including data storage unit control connected to said data storage unit and responsive to a two code sequence, said control including means responsive to a first code for controlling the direction of data transfer between said data storage unit and said arithmetic unit and means responsive to the second code for selecting the address of a register in said data storage unit for a data transfer.

12. The calculator system as claimed in claim 11 wherein said data storage unit control includes two counters, each of which can be effectively stepped up or down for selectively addressing a register for a data transfer and said means responsive to said second code controls the stepping of said two counters.

13. An electronic calculator system comprising:

an arithmetic unit for processing numerical values in accordance with instructions, a keyboard unit connected to said arithmetic unit having a plurality of manually actuable control elements including ten manual control keys representing numerical values from 0 through 9, a plurality of manual control keys representing instruction values, and logic responsive to operation of said keys for generating codes, each code having the same number of digits and representing either a numerical value or an instructional value.

a data storage unit connected to said arithmetic unit, said data storage unit including a multiplicity of registers for storing data words, and data storage unit control responsive to a two code sequence, said control including means responsive to a first code for controlling the direction of data transfer between said data storage unit and said arithmetic unit and means responsive to the second code for selecting the address of a register for a data transfer.

14. The calculator system as claimed in claim 13 wherein said data storage unit control includes two counters, each of which can be effectively stepped up or down for selectively addressing a register for a data transfer and said means responsive to said second code for controlling the stepping of said two counters.

15. An electronic calculator system comprising:

an arithmetic unit for processing numerical values in accordance with instructions, a keyboard unit connected to said arithmetic unit having a plurality of manually actuable control elements including ten manual control keys representing numerical values from 0 through 9, a plurality of manual control keys representing instruction values, and logic responsive to operation of said keys for generating codes, each code having the same number of digits and representing either a numerical value or an instructional value, a record reader adapted to receive a record defining a sequence of codes for the control of said arithmetic unit, control means for actuating said record reader to generate, in response to the record disposed therein, a series of codes to cause said arithmetic unit to perform a series of steps, and branch logic responsive to a first predetermined codes on a record in said record reader for actuating said control means to search through said sequence of codes on the record for a particular code identified by said control logic and to cause the calculator system to branch so that the arithmetic unit next responds to the series of codes on the record following said predetermined code.

16. The calculator system as claimed in claim 15 wherein said control means includes means responsive to the code immediately following said predetermined code to identify said particular code.

17. The calculator system as claimed in claim 16 wherein said branch logic further includes means responsive to a second predetermined code on the record in said record reader for causing the calculator system to branch and return to process a series of codes on the record following said first code.

18. The calculator system as claimed in claim 17 and further including means in said branch logic conditionally responsive to an output of said arithmetic unit.

19. The calculator system as claimed in claim 18 and further including a data storage unit connected to said arithmetic unit, said data storage unit including a multiplicity of registers for storing data words and data storage unit control responsive to a two code sequence, said control including means responsive to a first code for controlling the direction of data transfer between said data storage unit and said arithmetic unit and means responsive to the second code for selecting the address of a register for a data transfer.

20. The calculator system as claimed in claim 19 wherein said data storage unit control includes two counters, each of which can be effectively stepped up or down for selectively addressing a register for a data transfer and said means responsive to said second code for controlling the stepping of said two counters.